United States Patent
Chi et al.

(10) Patent No.: US 8,934,622 B2
(45) Date of Patent: Jan. 13, 2015

(54) METHOD FOR DETECTING DOUBLE-TALK CONDITION AND SYSTEM USING THE SAME

(71) Applicants: Sanghyun Chi, San Deigo, CA (US); Meoung-Jin Lim, San Deigo, CA (US)

(72) Inventors: Sanghyun Chi, San Deigo, CA (US); Meoung-Jin Lim, San Deigo, CA (US)

(73) Assignee: VIA Telecom Co., Ltd., Grand Cayman (KY)

( * ) Notice: Subject to any disclaimer, the term of this patent is extended or adjusted under 35 U.S.C. 154(b) by 101 days.

(21) Appl. No.: 13/632,163

(22) Filed: Oct. 1, 2012

(65) Prior Publication Data

US 2014/0093066 A1     Apr. 3, 2014

(51) Int. Cl.
    *H04M 9/08*     (2006.01)

(52) U.S. Cl.
    USPC .............................. 379/406.12; 379/406.01

(58) Field of Classification Search
    CPC ... H04M 9/082; H04M 3/002; H04M 7/0003; H04M 7/006; H04M 3/2272; H04M 9/085; H04M 11/062; H04M 1/58; H04B 3/23; H04B 3/234; H04B 3/20; H04B 3/235; H04B 3/237; H04B 7/015; H04B 3/21; H04B 3/02; G10L 2021/02082; G10L 21/0208; G10L 21/0232; G10L 25/78; G10L 19/012; G10L 21/02; H03H 21/0012; H03H 21/004; H03H 2021/0063; H03H 2021/0083
    USPC .............. 379/406.01–406.16, 3, 391–392.01; 455/570; 381/71.1–71.1; 370/286–292
    See application file for complete search history.

(56) References Cited

U.S. PATENT DOCUMENTS

| | | | | |
|---|---|---|---|---|
| 5,793,864 | A * | 8/1998 | Ramsden | 379/406.12 |
| 6,415,029 | B1 * | 7/2002 | Piket et al. | 379/406.04 |
| 8,090,094 | B2 * | 1/2012 | Takada | 379/406.04 |
| 2002/0057791 | A1 * | 5/2002 | Piket et al. | 379/417 |
| 2009/0028355 | A1 * | 1/2009 | Ishiguro | 381/66 |
| 2009/0257579 | A1 | 10/2009 | Takada | |

* cited by examiner

*Primary Examiner* — Akelaw Teshale
(74) *Attorney, Agent, or Firm* — Jianq Chyun IP Office

(57) ABSTRACT

A method for detecting a double-talk condition and an echo cancellation system using the same are introduced herein. According to an exemplary embodiment, the method may be adapted to an double-talk detector of an echo cancellation system and includes the following steps: obtaining an input signal with a first power; computing a second power, wherein the second power is a power combination of at least one estimated signal; determining whether the double-talk condition occurs according to a relationship between the first power and the second power, when the first power is larger than the second power, the double-talk condition occurs.

7 Claims, 3 Drawing Sheets

METHOD FOR DETECTING DOUBLE-TALK CONDITION AND SYSTEM USING THE SAME

BACKGROUND

1. Field of the Invention

The invention relates to a method for detecting a double-talk condition, in particular, to a method for detecting a double-talk condition by comparing powers within a linear region of estimated signals.

2. Description of Related Art

Techniques about echo cancellation are widely implemented in communication devices such as telephones. With the functionalities of echo cancellation, the user of the communication devices may normally perform voice input operations without being interfered by the echoed signals from the speaker of the communication devices.

In the field of echo cancellation techniques, it is important to detect whether a double-talk (DT) condition occurs during the procedure of echo cancellation. Without the detection of the double-talk condition, the performance of the echo cancellation would be dramatically deteriorated since the estimated echo channel may be different from the real echo channel. In detail, when the double-talk condition occurs, the echo signal would be mixed into a near-end signal that can be strongly correlated to the far-end, resulting in large interference components in the error signal. As a result, the echo canceller would diverge from its converged state if the adaptive filter updates its filter coefficients during the DT periods. Therefore, it is important to distinguish the states of the microphone input among the near-end only, the far-end only, and the DT periods.

Usually, the conventional double-talk detector (DTD) detects whether the double-talk condition occurs by taking gradient to the estimated echo channel for exploiting the energy level change. However, the computational complexity of the gradient operation is high. Besides, when the estimated echo channel is not accurate, the result of the double-talk condition detection would be erroneous as well.

SUMMARY

Accordingly, the present invention is directed to a effective method for detecting the double-talk condition by simply comparing powers of signals.

A method for detecting a double-talk condition is introduced herein. According to an exemplary embodiment, the method may be adapted to an double-talk detector (DTD) of an echo cancellation system and includes the following steps: obtaining an input signal with a first power; computing a second power, wherein the second power is a power combination of at least one estimated signal; determining whether the double-talk condition occurs according to a relationship between the first power and the second power, when the first power is larger than the second power, the double-talk condition occurs.

An echo cancellation system is introduced herein. The echo cancellation system includes a microphone, an echo canceller, a noise processing unit, a near-end voice detector, a far-end voice detector and a double-talk detector. The microphone is configured to generate an input signal. The echo canceller is coupled to the microphone and configured to generate an estimated echo signal and an error signal between the input signal and the estimated echo signal. The noise processing unit is coupled to the echo canceller and configured to generate an estimated noise signal in response to the error signal. The near-end voice detector is coupled to the microphone and configured to detect a near-end voice activity. The far-end voice detector, coupled to the echo canceller, and configured to detect a far-end voice activity. The double-talk detector is coupled to the near-end voice detector, the far-end voice detector, the echo canceller and the noise processing unit, and configured to execute program instructions to execute a procedure for detecting a double-talk condition, the procedure comprising: obtaining a first power of the input signal; computing a second power, wherein the second power is a power combination of at least one estimated signal; determining whether the double-talk condition occurs according to a relationship between the first power and the second power, when the first power is larger than the second power, the double-talk condition occurs.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1A:
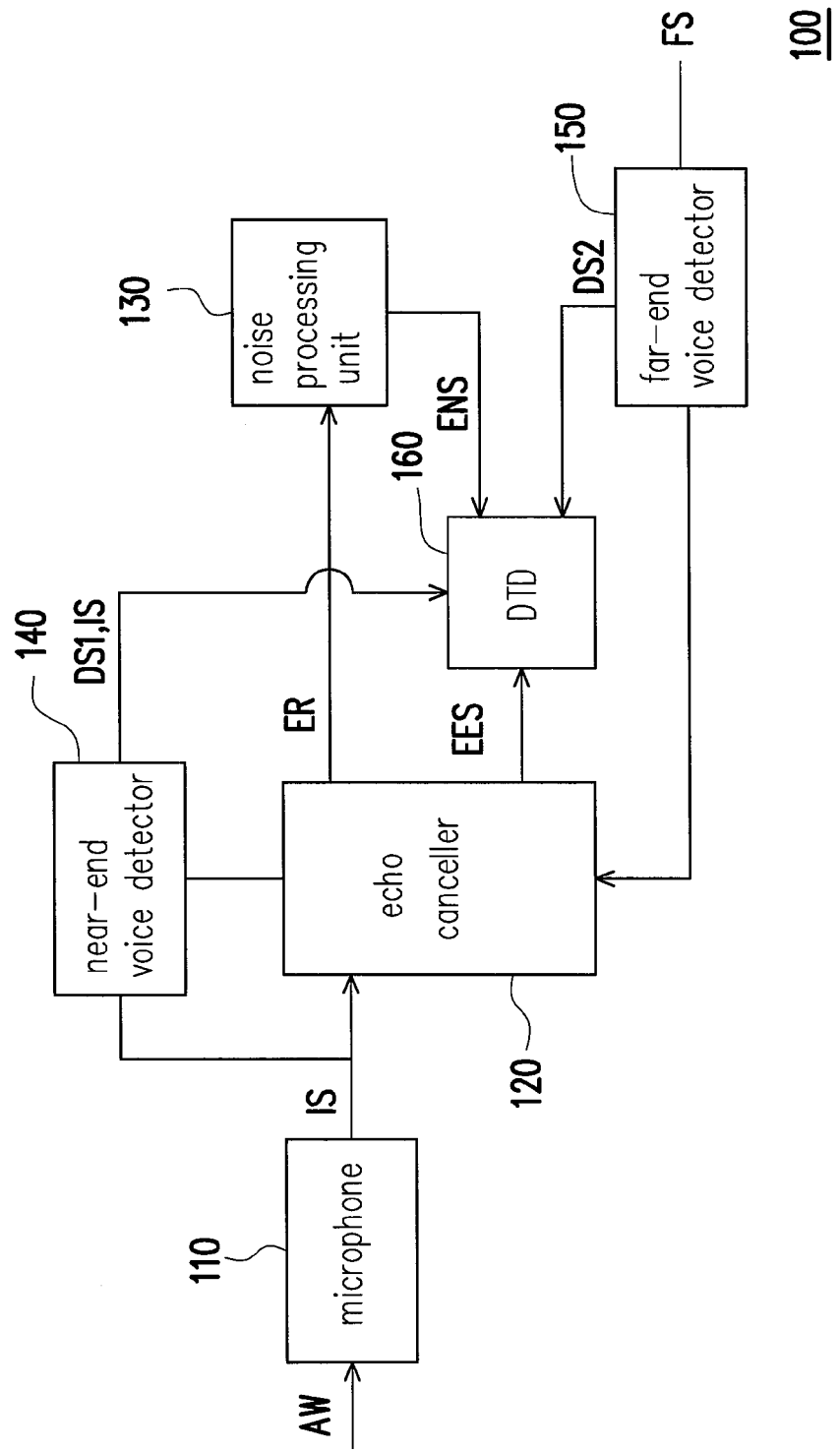
FIG. 1A is a functional block diagram illustrating an echo cancellation system according to an exemplary embodiment of the present invention.

Some embodiments of the present application will now be described more fully hereinafter with reference to the accompanying drawings, in which some, but not all embodiments of the application are shown. Indeed, various embodiments of the application may be embodied in many different forms and should not be construed as limited to the embodiments set forth herein; rather, these embodiments are provided so that this disclosure will satisfy applicable legal requirements. Like reference numerals refer to like elements throughout.

FIG. 1A is a functional block diagram illustrating an echo cancellation system according to an exemplary embodiment of the present invention. The echo cancellation system 100 may be disposed in an electronic apparatus (e.g., a telephone) to cancel the echo effects occurred in acoustic signal received by voice receivers (e.g., microphones). In this embodiment, the echo cancellation system 100 includes a microphone 110, an echo canceller 120, a noise processing unit 130, a near-end voice detector 140, a far-end voice detector 150 and a double-talk detector (DTD) 160. The microphone 110 is configured to generate an input signal IS by transforming the received acoustic wave AW (e.g., sound or voice).

The echo canceller 120 is coupled to the microphone 110, and configured to adaptively generate an estimated echo signal EES and an error signal ER between the input signal IS and the estimated echo signal EES. In some embodiments, the echo canceller 120 may include, but not limited to, an adaptive filter (not shown) and an echo cancellation unit (not shown). The adaptive filter may be configured to adaptively generate an estimated echo channel, and the estimated echo signal may be obtained by feeding a far-end signal FS into the estimated echo channel. The echo cancellation unit may be coupled to the microphone 110 and the adaptive filter, and configured to generate the error signal ER by subtracting the estimated echo signal EES from the input signal IS.

The noise processing unit 130 is coupled to the echo canceller 120 and configured to generate an estimated noise signal ENS in response to the error signal ER. The noise processing unit 130 may be, for example, an automatic noise suppressor (ANS), which may be configured to correspondingly generate an electronic signal with relatively low noise by performing a noise suppressing operation to the input signal IS.

The near-end voice detector 140 is coupled to the microphone 110 and configured to detect a near-end voice activity. Specifically speaking, in some embodiments, after the microphone 110 generates the input signal IS, the microphone 110 may forward the input signal IS to the near-end voice detector 140. Next, the near-end voice detector 140 may detect that the near-end voice activity occurs by sensing, for example, a voltage level change resulted from the input signal IS. Besides, the near-end voice detector 140 may output a determination signal DS1 according to the result of detecting the near-end voice activity. For example, the near-end voice detector 140 may output a logic 0 signal representing the near-end voice activity does not occur, or output a logic 1 signal representing the near-end voice activity occurs. Moreover, the near-end voice detector 140 may forward the input signal IS to the double-talk detector 160 for facilitating the detection of the double-talk condition. Herein, the double-talk condition represents that the input signal IS includes both of a near-end signal (which may be resulted from the inputted voice of the user) and an echo signal (which may be broadcasted by a speaker (not shown)).

The far-end voice detector 150 is coupled to the echo canceller 120 and configured to detect a far-end voice activity. Specifically speaking, in some embodiments, the far-end voice detector 150 may receive the far-end signal FS transmitted by, for example, another electronic apparatus communicating with the electronic apparatus where the echo cancellation system is disposed. Next, the far-end voice detector 150 may detect that the far-end voice activity occurs by sensing, for example, a voltage level change resulted from the far-end signal FS. Besides, the far-end voice detector 150 may output a determination signal DS2 according to the result of detecting the far-end voice activity. For example, the far-end voice detector 150 may output a logic 0 signal representing the far-end voice activity does not occur, or output a logic 1 signal representing the far-end voice activity occurs. To those with ordinary skills in the art, it should be understood that the aforementioned implementation of detecting the near-end or far-end voice activities are just taken as examples, which are not used to limit the scope of the present invention.

In some embodiments, the near-end voice detector 140 and the far-end voice detector 150 may be implemented by, for example, voice activity detectors (VAD), which are not limited thereto.

The double-talk detector 160 is coupled to the near-end voice detector 140, the far-end voice detector 150, the echo canceller 120 and the noise processing unit 130. By the estimated echo signal EES, the estimated noise signal ENS and the determination signals DS1 and DS2, the double-talk detector 160 may be configured to detect whether a double-talk condition occurs.

Figure 1B:
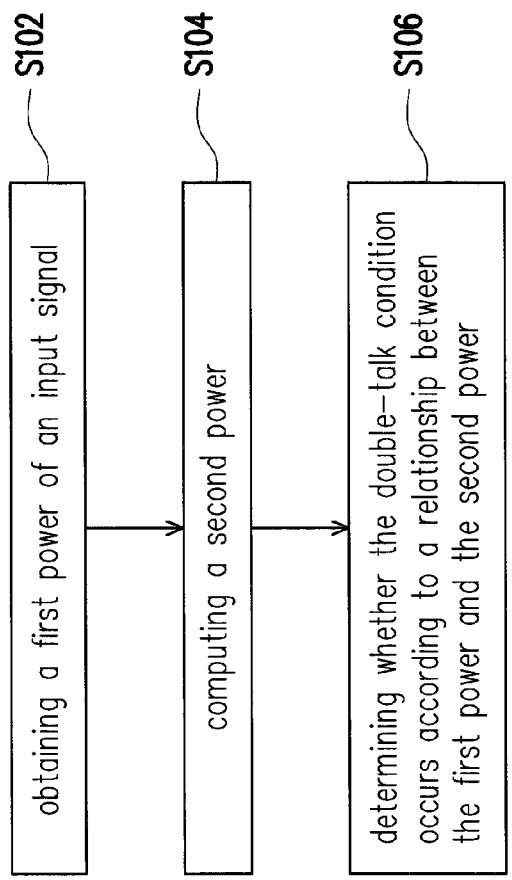
FIG. 1B is a flow chart illustrating a method for detecting a double-talk condition according to an exemplary embodiment of the present invention.

FIG. 1B is a flow chart illustrating a method for detecting a double-talk condition according to an exemplary embodiment of the present invention. Referring to both FIG. 1A and FIG. 1B, the proposed method for detecting the double-talk condition may be adapted for the foregoing double-talk detector 160 of the echo cancellation system 100, but the invention is not limited thereto.

In step S102, the double-talk detector 160 obtains a first power of the input signal IS. In some embodiments, the calculation of the first power of the input signal IS does not need to take all of the frequency components of the input signal IS into consideration, because the input signal IS may contain some components that will decrease the performance of the detection of the double-talk condition. For example, if the input signal IS contains some signal components (e.g., the echo channel) that previously passed an echo channel, the signal components may be distorted by the nonlinear region of the echo channel response. Therefore, when the first power is calculated according to all of the components of the input signal IS, the distorted signal components of the input signal IS may make the result of the detection of the double-talk condition become unreliable.

Hence, the double-talk detector 160 may firstly determine a first component of the input signal IS, in which the frequency region of the first component of the input signal IS may be determined according to the linear region of the echo channel response. For example, assuming that the components of the echo channel response within a frequency region 0-5 k Hz can be approximately regarded as linear, the first component of the input signal IS may be correspondingly obtained by extracting the components of the input signal IS within the frequency region 0-5 k Hz. Therefore, the first power may be calculated by simply considering the first component of the input signal IS. In some embodiments, the first power of the first component may be represented by $$p_1 = \xi_1 = \sum_{k \in L} \|S(k)\|^2,$$

where S(k) represents the $k_{th}$ frequency component of the input signal IS, L represents the frequency region of the first component. In other words, the first power is obtained by simply calculating the power of the input signal IS within the frequency region corresponding to the linear region of the echo channel response.

In step S104, the double-talk detector 160 may compute a second power, wherein the second power may be a power combination of at least one estimated signal. In this embodiment, the at least one estimated signal may include the estimated echo signal EES and the estimated noise signal ENS. In some embodiments, since the estimated echo signal EES may be generated by feeding the far-end signal FS into the estimated echo channel, some of the components of the estimated echo signal EES may be distorted by the nonlinear region of the estimated echo channel. Therefore, the calculation of the second power may not take all of the components of the estimated echo signal EES and the estimated noise signal ENS into consideration as well.

For example, the double-talk detector 160 may extract a second component of the estimated echo signal EES and extract a third component of the estimated noise signal ENS according to the linear region (e.g., 0-5 k Hz) of the echo channel response. That is, the second component of the estimated echo signal EES includes the frequency components of the estimated echo signal EES within the linear region (e.g., 0-5 k Hz), and the third component of the estimated noise signal ENS includes the frequency components of the estimated noise signal ENS within the linear region (e.g., 0-5 k Hz).

After determining the second component of the estimated echo signal EES, the double-talk detector 160 may calculate the component power of the second component by $$\sum_{k \in L} \|\tilde{Y}(k)\|^2,$$

where $\tilde{Y}(k)$ represents the $k_{th}$ frequency component of the second component of the estimated echo signal EES. Furthermore, with the third component of the estimated noise signal ENS, the double-talk detector 160 may also calculate the component power of the third component by $$\sum_{k \in L} \|\tilde{N}(k)\|^2,$$

where $\tilde{N}(k)$ represents the $k_{th}$ frequency component of the third component of the estimated noise signal ENS.

In some embodiments, the double-talk detector 160 may consider the noise margin effect by incorporating a margin factor as calculating the second power. For example, the second power may be represented by $$p_2 = \xi_2 + N_{margin} = \left[\sum_{k \in L} \|\tilde{Y}(k)\|^2 + \sum_{k \in L} \|\tilde{N}(k)\|^2\right] + \eta \sum_{k \in L} \|\tilde{N}(k)\|^2,$$

where $\eta$ represents the margin factor. The value of the margin factor may be, for example, between 0 and $(SNR)^{-1}$, where the SNR represents a signal-to-noise ratio of the input signal IS.

In step S106, the double-talk detector 160 determines whether the double-talk condition occurs according to a relationship between the first power and the second power. For example, when the first power is larger than the second power (i.e., $p_1 > p_2$), the double-talk detector 160 may determine that the double-talk condition occurs. Specifically, when the double-talk condition occurs, the input signal IS may simultaneously include the near-end signal, the echo signal and the noise signal, such that the first power (i.e., $p_1$) may be larger than the second power (i.e., $p_2$). That is, since the second power is computed according to the estimated echo signal EES (which is similar to the echo signal of the input signal IS) and the estimated noise signal ENS (which is similar to the noise signal of the input signal IS), the first power (i.e., $p_1$) may be larger than the second power (i.e., $p_2$) after incorporating the power of the near-end signal. On the other hand, when the first power is smaller than the second power (i.e., $p_1 < p_2$), the double-talk detector 160 may determine that the double-talk condition does not occur.

Therefore, whether the double-talk condition occurs may be easily determined by comparing the relationship between the first power and the second power, such that the computational complexity and implementation cost of the double-talk detector 160 may be correspondingly decreased. On the other hand, since the considered frequency region of the input signal IS, the estimated echo signal EES and the estimated noise signal ENS are determined according to the linear region of the echo channel response, the bad effects resulted from the nonlinear region of the echo channel response may be diminished.

Besides, after the double-talk detector 160 determines that the double-talk condition does not occur, the double-talk detector 160 may further determine whether a single-talk condition occurs by referring the detected voice activities of the near-end voice detector 140 and the far-end voice detector 150. Herein, the single-talk condition represents that the input signal IS only includes the noise signal and one of the near-end signal and echo signal. In detail, when a near-end single talk condition (i.e., the input signal IS only includes the noise signal and the near-end signal) occurs, the near-end voice detector 140 will output the determination signal DS1 as, for example, the logic 1 signal (representing that the near-end voice activity occurs). Since the far-end voice detector 150 does not detect the far-end signal FS, the determination signal DS2 may be, for example, the logic 0 signal (representing that the far-end voice activity does not occur). Therefore, according to the determination signals DS1 and DS2, the double-talk detector 160 may easily determine that the near-end single talk condition of the single-talk condition occurs.

On the other hand, when the voice detector 140 and the far-end voice detector 150 both detect that the corresponding voice activity occurs, and the double-talk detector 160 determines that the first power is smaller than the second power (i.e., $p_1 < p_2$), the double-talk detector 160 may also easily determine that a far-end single talk condition (i.e., the input signal IS only includes the noise signal and the echo signal) of the single-talk condition occurs.

Figure 2:
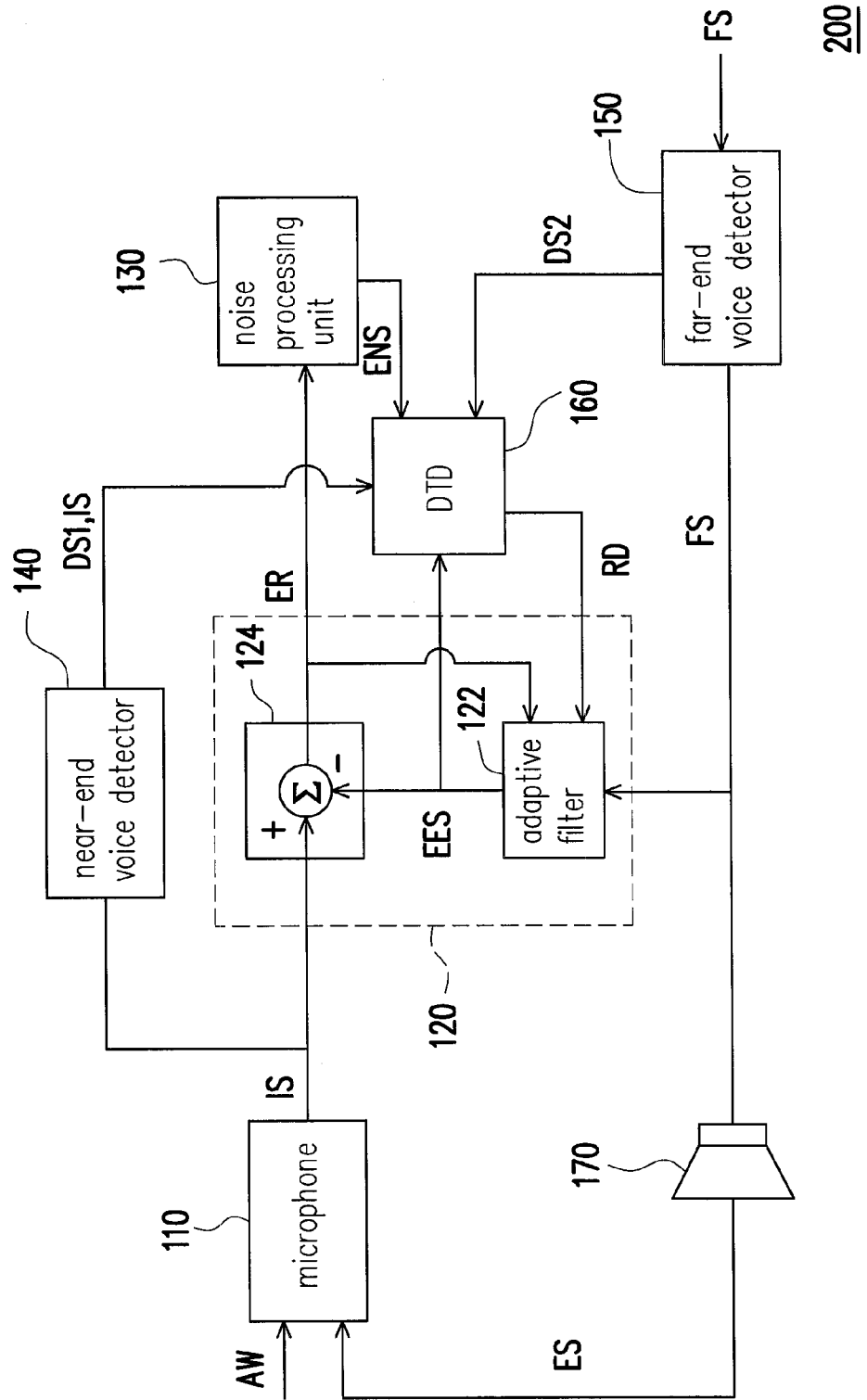
FIG. 2 is another functional block diagram of an echo cancellation system according to an exemplary embodiment of the present invention.

FIG. 2 is another functional block diagram of an echo cancellation system according to an exemplary embodiment of the present invention. Referring to FIG. 2, the echo cancellation system 200 includes the microphone 110, an echo canceller 120', the noise processing unit 130, the near-end voice detector 140, the far-end voice detector 150, a double-talk detector 160 and a speaker 170. In this embodiment, the connection between the microphone 110, the noise processing unit 130, the near-end voice detector 140, the far-end voice detector 150 and a double-talk detector 160 are the same as illustrated in FIG. 1A, which would not be repeated herein.

The echo canceller 120' includes an adaptive filter 122 and an echo cancellation unit 124. The adaptive filter 122 is coupled to the far-end voice detector 150 and the double-talk detector 160, and is configured to generate the estimated echo signal by feeding the far-end signal FS into the estimated echo channel (which is adaptively generated in response to the error signal ER and the result of the double-talk condition detection RD). The echo cancellation unit 124 is coupled to the adaptive filter 122, the microphone 110 and the noise processing unit 130. The echo cancellation unit 124 is configured to generate the error signal ER by subtracting the estimated echo signal EES from the input signal IS. The speaker 170 is coupled to the adaptive filter 122 and the far-end voice detector 150. In some embodiments, the outputted sound or voice of the speaker 170 may result in an echo signal ES to the microphone 110.

In some embodiments, the estimation operation of obtaining the estimated signals (e.g., the estimated noise signal ENS) or channels (e.g., the estimated echo channel) may be performed according to various adaptive algorithms such as least mean square (LMS), minimum mean-square error (MMSE), liner minimum mean-square error (LMMSE), least squares (LS), variable step-size LMS algorithm, robust variable step-size LMS algorithm, which are not limited thereto. Besides, the estimated echo signal EES may be generated by convoluting the time domain signals of the far-end signal FS and the estimated echo channel.

To sum up, embodiments of the present invention provide an effective method for detecting the double-talk condition, such that the computational complexity and implementation cost of the double-talk detector may be decreased. Besides, since the considered frequency region of the input signal and the estimated signals are within the linear region of the echo channel response, the performance of the proposed method is robust when there exists nonlinear components in the echo channel response.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for detecting a double-talk condition, adapted to a double-talk detector of an echo cancellation system, the method comprising:
   obtaining an input signal with a first power, wherein the obtaining the input signal with the first power comprises:
      determining a first component of the input signal, wherein a frequency region of the first component is determined according to a linear region of an echo channel response; and
      obtaining the first power by calculating a first component power of the first component;
   computing a second power, wherein the second power is a power combination of at least one estimated signal, wherein the at least one estimated signal comprises an estimated echo signal and an estimated noise signal, wherein the computing the second power comprises:
      determining a second component of the estimated echo signal and a third component of the estimated noise signal;
      calculating a second component power of the second component; and
      calculating a third component power of the third component, wherein the second power is computed by:

$$p_2 = \left[\sum_{k \in L} \|\tilde{Y}(k)\|^2 + \sum_{k \in L} \|\tilde{N}(k)\|^2\right] + \eta \sum_{k \in L} \|\tilde{N}(k)\|^2,$$

where $\tilde{Y}(k)$ and $\tilde{N}(k)$ respectively represents a $k_{th}$ frequency component of the second component and the third component, $\theta$ represents a margin factor, a frequency region of each of the second component and the third component is determined according to a linear region of an echo channel response, L represents the frequency region of the second component and the third component, wherein the margin factor is between 0 and a reciprocal of a signal-to-noise ratio of the input signal; and
   determining whether the double-talk condition occurs according to a relationship between the first power and the second power, when the first power is larger than the second power, the double-talk condition occurs.

2. The method as claimed in claim 1, wherein when the first power is smaller than the second power, determining that the double-talk condition does not occur.

3. The method as claimed in claim 1, wherein the first component power of the first component is obtained by:

$$p_1 = \sum_{k \in L} \|S(k)\|^2,$$

where $S(k)$ represents a $k_{th}$ frequency component of the input signal, L represents a frequency region of the first component.

4. An echo cancellation system, comprising:
   a microphone, configured to generate an input signal;
   an echo canceller, coupled to the microphone and configured to generate an estimated echo signal and an error signal between the input signal and the estimated echo signal;
   a noise processing unit, coupled to the echo canceller and configured to generate an estimated noise signal in response to the error signal;
   a near-end voice detector, coupled to the microphone and configured to detect a near-end voice activity;
   a far-end voice detector, coupled to the echo canceller, and configured to detect a far-end voice activity; and
   a double-talk detector, coupled to the near-end voice detector, the far-end voice detector, the echo canceller and the noise processing unit, and configured to execute program instructions to execute a procedure for detecting a double-talk condition, the procedure comprising:
      obtaining the input signal with a first power;
      computing a second power, wherein the second power is a power combination of at least one estimated signal; and
      determining whether the double-talk condition occurs according to a relationship between the first power and the second power, when the first power is larger than the second power, the double-talk condition occurs,
   wherein the double-talk detector determines a first component of the input signal, and obtains the first power by calculating a first component power of the first component,
   wherein the double-talk detector determines a frequency region of the first component according to a linear region of an echo channel response,
   wherein the at least one estimated signal comprises the estimated echo signal and the estimated noise signal, the double-talk detector determines a second component of the estimated echo signal and a third component of the estimated noise signal where the double-talk detector determines a frequency region of each of the second component and the third component according to a linear region of an echo channel response, and respectively calculates a second component power of the first component and a third component power of the third component, wherein the double-talk detector computes the second power by:

$$p_2 = \left[\sum_{k \in L} \|\tilde{Y}(k)\|^2 + \sum_{k \in L} \|\tilde{N}(k)\|^2\right] + \eta \sum_{k \in L} \|\tilde{N}(k)\|^2,$$

where $\tilde{Y}(k)$ and $\tilde{N}(k)$ respectively represents a $k_{th}$ frequency component of the second component and the third component, $\eta$ represents a margin factor, L represents the frequency region of the second component and the third component, the margin factor is between 0 and a reciprocal of a signal-to-noise ratio of the input signal.

5. The system as claimed in claim 4, wherein when the first power is smaller than the second power, the double-talk detector determines that the double-talk condition does not occur.

6. The system as claimed in claim 5, wherein the double-talk detector obtains the first component power of the first component by:

$$p_1 = \sum_{k \in L} \|S(k)\|^2,$$

where $S(k)$ represents a $k_{th}$ frequency component of the input signal, L represents a frequency region of the first component.

7. The system as claimed in claim 4, wherein the echo canceller comprises:
- an adaptive filter, coupled to the far-end voice detector and the double-talk detector, and configured to generate the estimated echo signal; and
- an echo cancellation unit, coupled to the adaptive filter, the microphone and the noise processing unit, and is configured to generate the error signal by subtracting the estimated echo signal from the input signal.

* * * * *